|  | United States Patent [19] | [11] | 4,051,096 |
|---|---|---|---|
|  | Koseki et al. | [45] | Sept. 27, 1977 |

[54] RESIN COMPOSITION

[75] Inventors: Toshinori Koseki; Kunio Maeda; Michihiro Aboshi; Haruo Kinoshita, all of Kawasaki, Japan

[73] Assignee: Asahi Kasei Kogyo Kabushiki Kaisha, Osaka, Japan

[21] Appl. No.: 696,395

[22] Filed: June 15, 1976

Related U.S. Application Data

[63] Continuation of Ser. No. 436,631, Jan. 25, 1974, abandoned.

[51] Int. Cl.$^2$ ............................ C08K 5/01; C08K 5/12
[52] U.S. Cl. ...................... 260/31.8 M; 260/31.8 PQ; 260/31.8 HR; 260/33.6 R; 260/33.6 PQ; 260/33.6 UA; 260/67 FP; 260/857 UN; 260/857 D; 260/889; 260/892; 260/893; 260/897 R; 260/897 A; 260/897 C
[58] Field of Search ................ 260/31.8 M, 31.8 PQ, 260/31.8 HR, 33.6 R, 33.6 PQ, 33.6 UA, 67 FP, 857 UN, 857 D, 889, 892, 893, 897 R, 897 A, 897 C

[56] References Cited

U.S. PATENT DOCUMENTS

| 3,201,364 | 8/1965 | Salyer ........................... 260/33.6 PQ |
| 3,779,918 | 12/1973 | Ikeda et al. ........................ 252/12.6 |

OTHER PUBLICATIONS

Condensed Chem. Dictionary (5th ed.) (Reinhold) (N.Y.) (1956), pp. 2, 3, & 24.
Hackh's Chem. Dictionary (4th ed.) (McGraw-Hill) (N.Y.) (1969), pp. 3 & 18.

*Primary Examiner*—Melvyn I. Marquis
*Assistant Examiner*—H. H. Fletcher
*Attorney, Agent, or Firm*—Cooper, Dunham, Clark, Griffin & Moran

[57] ABSTRACT

This invention relates to a resin composition comprising an oil retainer, a base thermoplastic resin and an oil. The affinity of the oil retainer and base resin to the oil is defined to result in a resin composition which is excellent in moldability, lubricity and surface appearance.

25 Claims, No Drawings

RESIN COMPOSITION

This is a continuation of application Ser. No. 436,631 filed Jan. 25, 1974, and now abandoned.

BACKGROUND OF THE INVENTION

Various methods have been tried to date for incorporating lubricating agents into resins with a view to imparting lubricity to such resin. Of the various methods, that which involves the incorporation of a lubricating oil has been particularly effective. However, the conventional techniques invariably involve many drawbacks and none of them have proved to be quite satisfactory from the practical point of view.

For example, Japanese Patent Publication No. 21786/1966 discloses a composition for bearing materials which has a lubricating oil of petroleum origin or a synthetic lubricating oil incorporated in ultra-high molecular weight polyethylene, Japanese Patent Publication No. 5321/1971 discloses a method for adding a lubricating oil to polyacetal or polyamide in the form of powder, and Japanese Patent Publication No. 41092/1972 discloses a composition which has an ester type lubricating oil incorporated in a polycarbonate resin.

In the combination of utra-high molecular weight polyethylene and a petroleum or synthetic lubricating oil, the components have a fairly high affinity for each other, there is a disadvantage that when the lubricating oil is incorporated in a sufficiently large quantity so as to attain ample improvement of the lubricity, the resultant composition becomes conspicuously soft and cannot be used for purposes which call for rigidity. Another disadvantage suffered by this combination is that the lubricating oil exudes and renders the surface of the composition wet and sticky. Since polyacetal, polyamide, or polycarbonate resin has substantially no affinity with lubricating oil, it is difficult to incorporate a sufficiently large quantity of lubricating oil into the resin. Even if a large quantity of lubricating oil is managed to be incorporated by use of a special device or method, the lubricating oil separates from the resin and consequently exudes heavily and renders the surface of the composition wet and sticky. Attempts to mold such compositions by use of an ordinary screw type injection or extrusion molding machine fail because the composition fails to make smooth contact with the interior contour of the molding machine. If there is employed a special device adapted to ensure perfect contact of the composition with the interior of the molding machine, the wet and sticky surface of the composition smears the metal dies while the molding is in process. With these methods, therefore, it has been difficult to obtain molded products of high dimensional accuracy and excellent surface appearance.

With a view to eliminating the drawbacks described above, various methods have been proposed involving the addition of a third substance. None of these studies have so far yield results which are fully satisfactory from the practical point of view. For example, Japanese Patent Publication No. 4634/1953 describes a method in which a lubricating oil solid at normal room temperatures and graphite or a finely divided carbon powder is added to a polyamide type synthetic resin, and Japanese Patent Publication No. 37571/1973 discloses a composition in which a thermoplastic material incorporates a mixture formed by impregnating graphite with a lubricating oil. The solid additives such as graphite, finely divided carbon powder and graphite have only a small capacity for retaining the lubricating oil. When the lubricating oil is added in a large quantity in order to impart sufficient lubricity, the lubricating oil readily separates from the plastic material in the molded article and exudes heavily to render the surface of the product wet and sticky.

Japanese Patent Publication No. 29374/1972 discloses a composition formed by adding to a synthetic resin material a product obtained by mixing ultra-high molecular weight polyethylene with a lubricating oil. The mixture of ultra-high molecular weight polyethylene with the lubricating oil lacks fluidity. When this mixture of insufficient fluidity is added to the synthetic resin material, it is not easily melted and dispersed while the composition is undergoing melt-mixing, extruding and molding processes. Alternatively, the ultra-high molecular weight polyethylene maybe finely divided and intimately mixed with a lubricating agent and thereafter the mixture added to the synthetic resin material, or the ultra-high molecular weight polyethylene maybe impregnated with the lubricating oil, then finely divided and thereafter added to the synthetic resin material. Even with these methods, it is difficult to manufacture a composition in which the ultra-high molecular weight polyethylene containing the lubricating agent is uniformly dispersed in the synthetic resin material, because the particles of the ultra-high molecular weight polyethylene distributed within the synthetic resin material have a particle diameter which is not smaller than that of the particles prior to addition to the resin material. Consequently, it is difficult to obtain from such composition a molded product having high dimensional accuracy and excellent surface appearance. It is similarly difficult to manufacture from such a composition products such as films and fibers.

With a view to improving the abrasion resistance of the composition described in Japanese Patent Publication No. 29374/1972, Japanese Patent Publication No. 37572/1973 discloses a composition which incorporates in addition, as a fourth component, a saturated or unsaturated higher fatty acid, a salt, an ester, an amide or chloride thereof or a metallic soap. Even with the addition of such a fourth component, it is still difficult to overcome the aforementioned drawbacks.

We have proposed a composition formed by combining a thermoplastic resin, a hydrocarbon lubrication oil as the lubricating agent and an ethylene copolymer to absorb and retain the lubricating agent (Japanese Patent Application No. 55677/1971 and Japanese Patent Disclosure No. 22133/1973). This composition has a disadvantage that since the ethylene copolymer has high affinity with the hydrocarbon type lubricating oil and absorbs a large quantity of the lubricating oil at normal room temperatures, the absorbed lubricating oil does not easily separate from the polymer and exude to the surface of the composition.

SUMMARY OF THE INVENTION

We have discovered that a resin composition free from the above difficulties can be obtained by selecting an oil retainer, base thermoplastic resin and oil which all satisfy specific conditions regarding the affinity of the oil retainer and base resin for the oil. Each composition of the claimed invention is a stable oil-retaining resin composition in which an oil is absorbed and remains absorbed in the oil retainer resin.

In its broadest aspect this invention relates to a resin composition which comprises 0.1 - 25 percent by weight of an oil retainer, 99.8 - 50 percent by weight of a base resin and 0.1 - 25 percent by weight of an oil, with the weight ratio of oil to oil retainer being from 0.3 - 1 to 25 - 1.

DETAILED DISCLOSURE OF THE INVENTION

OIL RETAINER

The "oil retainer" is a thermoplastic resin which has a lower flowing temperature than the base resin, remains undissolved in the oil at normal room temperatures and absorbs not more than 0.03 times its own weight of oil (not exceeding 0.03 to 1 in terms of the weight ratio of oil to oil retainer) and which, at a temperature 10° C higher than the flowing temperature of the base resin, dissolves in the oil or absorbs not less than 0.3 times its own weight of the oil (i.e. not less than 0.3 to 1 in terms of the weight ratio of oil to oil retainer). Further, the oil retainer is such tht once it has absorbed the oil in a quantity of not less than 0.3 to 1 in terms of the weight ratio of oil to oil retainer at a temperature 10° C higher than the flowing temperature of the base resin, it begins to release the oil when it is lowered to normal room temperature.

The term "flowing temperature" as used herein means the temperature at which a given resin begins to melt and flow from the orifice of an extruder type plastometer provided with an orifice measuring 1 mm in diameter and 30 mm in length, when heated at a fixed rate of temperature increase of 3° C/minute under a pressure of 50 kg/cm$^2$.

The oil retaining properties of the resin are determined as follows. A test piece, 1 mm in thickness and 1 g in weight of the resin should remain undissolved in the oil and absorb the oil in a quantity not more than 0.03 to 1 in terms of the weight ratio of oil to oil retainer after standing in the oil at normal room temperatures for 5 days. When the same test piece 1 mm in thickness and 1 g in weight is left to stand in the oil at a temperature 10° C higher than the flowing temperature of the base resin for 5 hours, it should dissolve in the oil or absorb the oil in a quantity of not less than 0.3 to 1 in terms of weight ratio of oil to oil retainer.

BASE RESIN

The term "base resin" as used herein means a thermoplastic resin which remains undissolved in the oil and absorbs not more than 0.03 times its own weight of oil (i.e. not exceeding 0.03 to 1 in terms of weight ratio of oil to base resin). It is further required to be such that at a temperature 10° C higher than the flowing temperature of the base resin, it absorbs the oil in a quantity not exceeding one half of the weight of the oil absorbed by the oil retainer.

The quantity of oil which the base resin absorbs at normal room temperature is measured under the same conditions as in the case of the oil retainer. This base resin is required to absorb the oil in a quantity not exceeding 0.03 to 1 in terms of the weight ratio of oil to base resin. The quantity of oil which the base resin absorbs at a temperature 10° C higher than the flowing temperature of the base resin, as measured under the same conditions as in the case of the oil retainer, is required to be less than one half, desirably one quarter and preferably one tenth, of the quantity of oil which the oil retainer absorbs as measured under the same conditions.

OIL

The oil for the purpose of this invention is a lubricating oil which is liquid at normal room temperatures or which, though solid at normal room temperatures, becomes fluidized at a temperature lower than the flowing temperature of the base resin. Lubricating oils which are in general use invariably satisfy this requirement.

Examples of compounds usable as the oil retainer in the present invention are polyolefins, ionomers, polystryrene, acrylonitrile-styrene copolymer and acrylonitrile-butadiene-styrene copolymer. The suitable polyolefins include polyethylene, polypropylene, polybutene and poly-4-methylpentene-1. Surlyn A, trademark name for DuPont's product, may be cited as an example of ionomer. Needless to mention, these must satisfy the requirements for the oil retainer described above.

Examples of compounds usable as the base resin in this invention are:
Polyacetal resin eg., polyoxymethylene homopolymer copolymer of formaldehyde, trioxan, tetraoxan and not more than 20 mol % of cyclic ether having a carbon number up to 8
Polyamide resin eg., polyhexamethylene adipamide poly- ε -caproractam polyhexamethylene sebacamide polyamino undecanoic acid poly ω -lauro lactam condensation polymerization product of terephthalic acid and trimethyl hexamethylenediamine
Polyester resin eg., polybutylene terephthalate polyethylene terephthalate 1.4-cyclohexylene dimethylene terephthalate/isophthalate copolymer polyethylene-1.2-diphenoxymethane-4.4-dicarboxylate polybuthylene terephthalate containing tetrabromobisphenol A not more than 5 mol % as a comonomer
Polycarbonate resin eg., aromatic polycarbonate
Polyvinyl chloride resin eg., polyvinylchloride homopolymer copolymer of vinylchloride and not more than 20 mol % of vinylacetate copolymer of vinylchloride and not more than 20 mol % of propylene copolymer of vinylchloride and not more than 20 mol % in total of ethylene and vinylacetate
Polystyrene resin eg., polystyrene homopolymer copolymer of styrene and not more than 20 mol % of methyl methacrylate copolymer of styrene and not more than 20 mol % of α -methylstyrene
Acrylic resin eg., polymethyl methacrylate copolymer of methyl methacrylate and not more than 20 mol % of α -methyl styrene copolymer of methyl methacrylate and not more than 20 mol % of ethyl methacrylate copolymer of methyl methacrylate and not more than 20 mol % of n-butyl methacrylate
Fluorocarbon resin eg., poly-monochlorotrifluoroethylene polyvinylidene floride copolymer of tetrafluoroethylene and 15 to 25 weight % of hexafluoropropylene polytetrafuluoroethylene having perfluoroalkoxy lateral chain copolymer of tetrafuluoroethylene and ethylene
Polyphenylene oxide eg., polyphenylene oxide modified polyphenylene oxide having 40 to 60 weight % of polystylene
Polyphenylene sulfide resin
Polysulfone resin
Polyaryl sulfone resin Polyaryl ether resin
Polyether sulfone resin
Polyvinyl formal resin
Polyvinyl butyral resin
Acrylonitrile-styrene resin
Acrylonitrile-butadiene-styrene resin These resins may be in the form of copolymers incorporating not more than 20 mol. percent of copolymerizable monomers. Of these resins, particularly desirable are polyacetal resin, polyamide resin, polyester resin, polycarbonate resin and polyphenylene oxide resin.

Examples of oils usable in the present invention are paraffin, naphthene, aromatic and other hydrocarbon oils, alkyl ester and other ester oils and glycol oils. Of these oils, particularly desirable are hydrocarbon oils and ester oils.

In the present invention, the combination of the three components i.e. oil retainer, base resin and oil in the manner described above is critical. Naturally, the kinds of oil retainer and base resin which will be effective in the combination will vary with the particular kind of oil to be selected.

When a paraffin or napthene oil is selected for example, it is desirable to use a polyolefin or an ionomer as the oil retainer and to use, as the base resin, one or more resins selected from polyacetal resin, polyamide resin, polyester resin, polycarbonate resin, polyvinyl chloride resin, acrylonitrilestyrene copolymer, acrylic resin, fluorocarbon resin, polyphenylene oxide resin, polyphenylene sulfide resin, polysulfone resin, polyaryl sulfone resin, polyaryl ether resin, polyether sulfone resin, polyvinyl formal resin and polyvinyl butyral resin. More specifically, a preferred combination comprises a paraffin or napthene oil as the lubricating oil, polyethylene or polypropylene as the oil retainer, and one or more resins selected from polyacetal resin, polyamide resin, polyester resin, polycarbonate resin and polyphenylene oxide resin as the base resin.

When an aromatic oil is selected as the lubricating oil, it is desirable to use a polyolefin, an inonomer or polystyrene as the oil retainer and to use as the base resin one or more resins selected from polyacetal resin, polyamide resin, polyester resin and fluorocabon resin.

When an ester oil is selected as the lubricating oil, it is desirable to use as the oil retainer a polyolefin or an ionomer, and as the base resin one or more resins selected from polyacetal resin, polyamide resin, polyester resin, acrylonitrile-styrene copolymer, acrylonitrile-styrene-butadiene copolymer, fluorocarbon resin, polyphenylene oxide resin, polyphenylene slfide resin, polysulfone resin, polyaryl sulfone resin, polyallyl ether resin and polyether sulfone resin. More particularly when using an ester oil as the lubricating oil, a preferred combination is obtained by using as the oil retainer polyethylene or polypropylene, and as the base resin polyacetal resin, polyamide resin, polyester resin or polyphenylene oxide resin.

The proportions of the aforementioned three components of the composition i.e. oil retainer, base resin and oil are also critical to attain the full effect of the present invention.

The amount of the oil retainer in the composition is required to be in the range of from 0.1 to 25 percent by weight. When the oil retainer is used in an amount exceeding the upper limit of 25 percent by weight, the inherent attributes of the base resin are impaired. When it is used in an amount of less than 0.1 percent by weight, the effect of the present invention is quite insignificant. A more desirable range of the amount of the oil retainer is from 0.5 to 10 percent, perferably from 1 to 5 percent, by weight.

The amount of oil in the composition is in the range of from 0.1 to 25 percent by weight. When the oil is used in an amount exceeding the upper limit of 25 percent by weight, the admixture of the oil with the resin is not easily accomplished and the inherent attributes of the base resin are impaired. When it is used in an amount of less than 0.1 percent by weight, the lubricity imparted is not sufficient. A more desirable range of the amount of oil is from 1 to 20 percent, preferably from 3 to 13 percent, by weight.

The amount of the base resin in the composition is in the range of from 99.8 to 50 percent by weight. A more desirable range is from 98.5 to 70 percent, preferably from 96 to 80 percent, by weight.

Further, the weight ratio of oil to oil retainer is required to fall in the range from 0.3 to 1 to 25 to 1. When the ratio exceeds the upper limit of 25 to 1, the oil content becomes too large to permit smooth mixing of the components. When the ratio is less than 0.3 to 1, however, the resultant composition suffers from insufficient lubricity. A more desirable range of the weight ratio is from 2 to 1 to 15 to 1, preferably from 3 to 1 to 12 to 1.

The affinity which the oil retainer and the base resin have for the oil is also a critical factor in the present invention.

The resin serving as the oil retainer is required to be such that a test piece, 1 mm in thickness and 1 g in weight, of the resin neither dissolves in the oil nor absorbs the oil in a quantity exceeding 0.03 to 1 in terms of the weight ratio of oil to oil retainer when it is left to stand in the oil at normal room temperatures for 5 days. If the oil retainer absorbs the oil in a quantity exceeding this limit, then the oil absorbed at higher temperatures does not easily separate from the oil retainer at normal room temperatures. A more desirable upper limit of the oil to be absorbed in 0.01 to 1 in terms of the above weight ratio. When the same test piece of the resin is left to stand for 5 hours in the oil at a temperature 10° C higher than the flowing temperature of the base resin, it is required to dissolve in the oil or absorb the oil in a quantity of not less than 0.3 to 1 in terms of the weight ratio of oil to oil retainer. Below the lower limit of 0.3 to 1, the quantity of oil absorbed is not sufficient to provide the desired lubricity. A more desirable lower limit of the ratio is 1 to 1. The flowing temperature of the oil retainer is also required to be lower than that of the base resin. If the flowing temperature of the oil retainer is higher than that of the base resin the dispersion of the oil and oil retainer into the base resin fails to proceed satisfactorily.

The base resin, when tested under the same conditions as the oil retainer, is required to absorb the oil in a quantity not exceeding 0.03 to 1 in terms of the weight ratio of oil to base resin at normal room temperatures. If the base resin absorbs the oil beyond this limit, the base resin tends to become too soft. A more desirable upper limit of the ratio is 0.01 to 1, preferably 0.005 to 1. The quantity of the oil which base resin absorbs at a temperature 10° C higher than the flowing temperature, when measured under the same conditions as in the case of the oil retainer, must be less than one half, more desirably less than one quarter and preferably one tenth, of the quantity of oil absorbed by the oil retainer. Beyond this limit, the distribution of the oil in the base resin is increased, decreasing the intended effect of the oil retainer.

The composition of this invention formed in accordance with the foregoing conditions has well balanced characteristics of lubricity and moldability. It also has excellent dispersibility and resultant dimensional accuracy and can be formed into molded articles which are free from stickiness and have good surface appearance.

Optionally, various additives may be incorporated into the composition. For example, solid lubricants such as graphite, molybdenum disulfide, Teflon powder, boron nitride and graphite fluoride; inorganic powdery fillers such as talc, calcium carbonate, kaolin, glass powder, glass beads and glass microspheres; inorganic fibrous reinforcements such as glass fiber, carbon fiber and asbestos; metal powders such as aluminium dust, iron dust and copper dust; and metal fibers such as stainless steel wool can effectively be used in the composition to meet individual requirements.

Various methods are available for the production of the composition of this invention. For example, the composition may be obtained by simultaneously heating, agitating and blending the three components i.e. oil retainer, base resin and oil; by mixing the oil retainer and the oil in advance and subsequently incorporating the base resin into the resultant mixture; by introducing the oil either during or after mixing the base resin with the oil retainer; introducing the oil retainer either during or after mixing of the base resin with oil. The sequences of mixing, the method of addition of the oil and oil retainer, the method of heating, etc. can all be selected to suit particular requirements.

Devices which are ordinarily employed for mixing or blending operations can be used effectively.

From the operational point of view, it is desirable that the oil retainer and the base resin to be used as the raw materials for the compositions of this invention are in a finely divided form having a particle size finer than 10 mesh. The same raw materials may otherwise be used effectively even when they are in the form of pellets.

The present invention will be described in further detail in the following examples, which are solely illustrative, and not in any way limitative, of the present invention.

EXAMPLES (1 – 6, 14 – 89)

In each of the following examples, a base resin, an oil retainer and an oil of various quantities satisfying the prescribed proportions (total of about 5 kg) were mixed for 10 minutes with application of heat in a 20-liter Henschel mixer (high-speed fluid mixing apparatus), when the temperature was maintained below the flowing temperature of the oil retainer and also in such a range that the oil retainer might not dissolve and adhere to the mixer. The resultant mixture was pelletized by use of a monoaxial bent type extruder (40 mm in barrel diameter and L/D = 28). The pellets obtained were tested for plasticizing time by use of a screw type injection molding machine (50 z). A cylindrical test piece was prepared from the pellets by use of the screw type injection molding machine (50 z). This test piece was tested for friction coefficient by use of a thrust type friction coefficient tester (Suzuki model), with the load fixed at 2 kg/cm$^2$, the linear velocity at 1 cm/sec and the resin-to S45C steel.

Separately, the base resin and the oil retainer were each molded by a compression molding machine to produce a flat sheet 1 mm in thickness. A test piece weighing 1 g was cut out of the flat sheet. Each test piece was allowed to stand immersed in the oil for 5 days at normal room temperatures. At the end of this time, the test piece was measured to determine the absorbed oil. The weight ratios of the absorbed oil to the base resin and to the oil retainer were found and reported as magnitudes of oil absorption in the respective resins at normal room temperatures.

The same test pieces as those used in the measurement of oil absorption at normal room temperatures were allowed to stand in the oil for 5 hours at a temperature 10° C higher than the flowing temperature of the base resin. At the end of this time, the test pieces were measured with respect to the absorbed oil. The weight ratios of the absorbed oil to the base resin and to the oil retainer were found and reported as magnitudes of oil absorption in the respective resins at the elevated temperature. When a test piece was dissolved in the oil, the weight ratio was expressed as $\infty$.

After the measurement of the oil absorption at the elevated temperature, the ability of the oil retainer to release the oil was evaluated by visual observation. The ability was rated by a five-point scale in which "heavy", "medium" and "slight" indicated respective degrees of oil exudation.

The flowing temperature was determined using a 2 g specimen of a given resin on a Koken-type flow-tester.

EXAMPLES (7 – 9)

In each of the following examples, a base resin and an oil retainer of various quantities satisfying the prescribed proportions (total of about 20 Kg) were mixed for 20 minutes at a room temperature in a 50 liter ribon blender (low-speed mixing apparatus). The resultant mixture was extruded by use of a monoaxial vent pype extruder (65 mm barrel diameter and L/D=34). In the corse of the extrusion a prescribed amount of oil was incorporated into the molton resin under a pressure higher than that of the molton resin and the mixture was pelletized. The pellets obtained were tested for plasticizing time by use of a screw type injection molding machine (50 z). A cylindrical test piece was prepared from the pellets by use of the screw type injection molding machine (50 z). This test piece was tested for friction coefficient by use of a thrust type friction coefficient tester (Suzuki model), with the load fixed at 2 kg/cm$^2$, the linear velocity at 1 cm/sec and the resin-to S45C steel.

Separately, the base resin and the oil retainer were each molded by a compression molding machine to produce a flat sheet 1 mm in thickness. A test piece weighing 1 g was cut out of the flat sheet. Each test piece was allowed to stand immersed in the oil for 5 days at normal room temperatures. At the end of this time, the test piece was measured to determine the absorbed oil. The weight ratios of the absorbed oil to the base resin and to the oil retainer were found and reported as magnitudes of oil absorption in the respective resins at normal room temperatures.

The same test pieces as those used in the measurement of oil absorption at normal room temperatures were allowed to stand in the oil for 5 hours at a temperature 10° C higher than the flowing temperature of the base resin. At the end of this time, the test pieces were measured with respect to the absorbed oil. The weight ratios of the absorbed oil to the base resin and to the oil retainer were found and reported as magnitudes of oil absorption in the respective resins at the elevated temperature. When a test piece was dissolved in the oil, the weight ratio was expressed as ∞.

After the measurement of the oil absorption at the elevated temperature, the ability of the oil retainer to release the oil was evaluated by visual observation. The ability was rated by a five-point scale in which "heavy", "medium" and "slight" indicated respective degrees of oil exudation.

The flowing temperature was determined using a 2 g specimen of a given resin on a Koken-type flow-tester.

EXAMPLES (10 – 13)

In each of the following examples, a base resin, an oil retainer and an oil of various quantities satisfying the prescribed proportions (total of about 20 Kg) were mixed for 10 minutes at a room temperature in a 50 liter ribon blender (low-speed mixing apparatus). The resultant mixture was pelletized by use of a biaxial Windsor type extruder (50 mm in screw diameter). The pellets obtained were tested for plasticizing time by use of a screw type injection molding machine (50 z). A cylindrical test piece was prepared from the pellets by use of the screw type injection molding machine (50 z). This test piece was tested for friction coefficient by use of a thrust type friction coefficient tester (Suzuki model), with the load fixed at 2 kg/cm$^2$, the linear velocity at 1 cm/sec and the resin-to S45C steel.

Separately, the base resin and the oil retainer were each molded by a compression molding machine to produce a flat sheet 1 mm in thickness. A test piece weighing 1 g was cut out of the flat sheet. Each test piece was allowed to stand immersed in the oil for 5 days at normal room temperatures. At the end of this time, the test piece was measured to determine the absorbed oil. The weight ratios of the absorbed oil to the base resin and to the oil retainer were found and reported as magnitudes of oil absorption in the respective resins at normal room temperatures.

The same test pieces as those used in the measurement of oil absorption at normal room temperatures were allowed to stand in the oil for 5 hours at a temperature 10° C higher than the flowing temperature of the base resin. At the end of this time, the test pieces were measured with respect to the absorbed oil. The weight ratios of the absorbed oil to the base resin and to the oil retainer were found and reported as magnitudes of oil absorption in the respective resins at the elevated temperature. When a test piece was dissolved in the oil, the weight ratio was expressed as ∞.

After the measurement of the oil absorption at the elevated temperature, the ability of the oil retainer to release the oil was evaluated by visual observation. The ability was rated by a five-point scale in which "heavy", "medium" and "slight" indicated respective degrees of oil exudation.

The flowing temperature was determined using a 2 g specimen of a given resin on a Koken-type flow-tester.

The base resins, oil retainers, oils and additives which were used in the cited examples were as follows:

(Base resins)

Polyoxymethylene 1 : Polyoxymethylene homopolymer, MI = 13, for injection molding Polyoxymethylene 2 : Copolymer of formaldehyde, trioxan, tetraoxan and not more than 20 mol % of cyclic ether having a carbon number up to 8, MI = 9, for injection molding Polyamide 1 : Polyhexamethylene adipamide, Sulfuric acid viscosity = 2.5, for injection molding Polyamide 2 : Polyε-caproractam, sulfuric acid Viscosity = 2.7, for injection molding Polyamide 3 : Polyhexamethylene sebacamide, Sulfuric acid viscosity = 2.6, for injection molding Polyamide 4 : Polyamino undecanoic acid, Sulfuric acid Viscosity = 2.4, for injection molding Polyamide 5 : Polyω-lauro lactam, sulfuric acid viscosity = 2.4, for injection molding Polyamide 6 : condensation polymerization product of terephthalic acid and trimethyl hexamethylene diamine, sulfuric acid viscosity = 2.5, for injection molding Polyester 1 : Polybuthylene terephthalate, solution viscosity = 1.2, for injection molding Polyester 2 : Polyethylene terephthalate, solution viscosity = 1.2, for injection molding Polyester 3 : 1,4-cyclohexylene dimethylene terephthalate/isophthalate copolymer, solution viscosity = 1,2, for injection molding Polyester 4 : Polyethylene-1, 2-diphenoxyethane-4, 4'-dicarboxylate, solution viscosity = 1.2, for injection molding Polyester 5 : Polybuthylene terephthalate containing tetrabromobisphenol A not more than 5 mol % as a comonomer, solution viscosity = 1.2, for injection molding Polycarbonate : Aromatic polycarbonate, average molecular weight = 25,000, for injection molding Polyvinyl chloride 1 : Polyvinyl chloride homopolymer, average polymerization grade = 800

Polyvinyl chloride 2 : Copolymer of vinyl chloride and not more than 20 mol % of vinyl acetate, average polymerization grade = 1,100

Polyvinyl chloride 3 : Copolymer of vinylchloride and not more than 20 mol % of propylene, average polymerization grade = 800

Polyvinyl chloride 4 : Copolymer of vinylchloride and not more than 20 mol % in total of ethylene and vinylacetate, average polymerization grade = 1,000

Polystyrene 1 : Polystylene homopolymer, for injection molding

Polystylene 2 : Copolymer of stylene and not more than 20 mol % of methylmethacrylate, for injection molding Polystylene 3 : Copolymer of stylene and not more than 20 mol % of α-methylstylene, for injection molding Acrylic resin 1 : Polymethyl methacrylate, for injection molding Acrylic resin 2 : Copolymer of methyl methacrylate and not more than 20 mol % of α-methyl stylene, for injection molding Acrylic resin 3 : Copolymer of methyl methacrylate and not more than 20 mol % of ethyl methacrylate, for injection molding Acrylic resin 4 : Copolymer of methyl methacrylate and not more than 20 mol % of n-butyl methacrylate, for injection molding Fluorocarbon resin 1 : Polymonochlorotrifluoroethylene, for injection molding Fluorocarbon resin 2 : Polyvinylidene fluoride, for injection molding Fluorocarbon resin 3 : Copolymer of tetrafluoroethylene and 15 to 25 weight % of hexafluoropropylene, for injection molding Fluorocarbon resin 4 : Polytetrafluoroethylene having perfluoroalkoxy lateral chain, for injection molding
Fluorocarbon resin 5 : Copolymer of tetrafluoroethylene and ethylene, for injection molding
Polyphenylene oxide 1 : Polyphenylene oxide, for injection molding
Polyphenylene oxide 2 : Modified polyphenylene oxide having 40 to 60 weight % of polystylene, for injection molding
Polyphenylene sulfide : For injection molding
Polysulfone : For injection molding
Polyaryl sulfone : For injection molding
Polyaryl ether : For injection molding
Polyether sulfone : For injection molding
Polyvinyl formal : For injection molding
Polyvinyl butyral : For injection molding
Acrylonitrile-styrene copolymer : For injection molding
Acrylonitrilebutadiene-styrene copolymer : For ordinary injection molding (Oil retainer)

Polyethylene 1 : High-density polyethylene, MI = 6.0, for injection molding
Polyethylene 2 : High-density polyethylene, MI = 0.04, for extrusion molding
Polyethylene 3 : Low-density polyethylene, MI = 10, for injection molding
Ultra-high molecular polyethylene : Average molecular weight = 1,000,000
Polypropylene : MFI = 9.0, for injection molding
Ethylene propylene block copolymer : MFI = 2.0, ethylene content 5 percent by weight, for injection molding
Polybutene-1 : For injection molding
Poly-4-methylpentene-1 : For injection molding
Ethylene-vinyl acetate copolymer : MI = 150, vinyl acetate content 28 percent by weight, for injection molding (Oil)

Paraffin : Paraffin type oil of viscosity 10 cst (37.8° C)
Naphthene : Naphthene type oil; SUS 56, 98.3° C
Aromatic: Aromatic type oil of aromatic content of 50 percent by weight, viscosity 15 cst (37.8° C)
Ester : Di-($C_{10}$ - oxo)-Sebacate
Paraffin wax : Average molecular weight = 1,000

(Additives)

Graphite : Average particle size = 300 mesh
Molybdenum disulfide : Average particle size = 300 mesh
Teflon dust : Polytetrafluoroethylene dust, average particle size = 40 mesh
Boron nitride : Average particle size = 150 mesh
Graphite fluoride : Average particle size = 300 mesh
Talc : Average particle diameter = 2 $\mu$
Calcium carbonate : Heavy calcium carbonate, average particle diameter = 0.5 $\mu$
Kaolin : Average particle diameter = 1 $\mu$
Glass dust : Average particle diameter = 10 $\mu$
Glass beads : Average particle diameter = 10 $\mu$
Glass microspheres : Average particle diameter = 200 $\mu$
Glass fiber : Diameter 10 $\mu$ and length 0.3 mm
Carbon fiber : Diameter 10 $\mu$ and length 0.5 mm
Asbestos : Class 7 T
Aluminium dust : Average particle size = 60 mesh
Iron dust : Average particle size = 40 mesh
Copper dust : Average particle size = 60 mesh The Examples (and reference examples) are enumerated in Tables 1 to 6.

Table 1

| Example (Reference No.) | Base resin | | | Oil retainer | | | | | | Weight ratio of oil/oil retainer | Pleasticizing time during molding (sec.) | Friction coefficient (μ) | Appearance of molded product |
|---|---|---|---|---|---|---|---|---|---|---|---|---|---|
| | Name (percent by weight) | Oil absorption at normal temp. (by weight ratio) | Oil absorption elevated temp. (by weight ratio) | Additive (percent by weight) | Name (percent by weight) | Oil absorption at normal temp. (by weight ratio) | Oil absorption elevated temp. (by weight ratio) | Ability to release oil | Oil (percent by weight) | | | | |
| 1 *1 | Polyoxy-methylene 1 (90) | 0.0010 | 0.05 max. | — | Polyethylene 1 (2)*2 | 0.0012 | 2.3 *3 | Heavy | Naphthene (8) | 4 | 12 | 0.13 | Good |
| 2 | " (90) | " | " | — | Polyethylene 2 (2)*4 | 0.0013 | 2.2*3 | " | Naphthene (8) | 4 | 28 | 0.09 | Good |
| 3 | " | " | " | — | Polyethylene 3 (2) | 0.0016 | 3.1 | " | " (9) | 3 | 35 | 0.11 | " |
| 4 | " (88) | " | " | — | Polypropylene (3)*5 | 0.0003 | 2.8 | " | " (9) | " | " | 0.12 | " |
| 5 | " | 0.0012 | " | — | Polystyrene 1 (3)*6 | 0.0002 | 1.2 | " | " | 3 | 35 | 0.18 | " |
| 6 | " | " | " | — | Polyethylene 2 (2) Polypropylene (1) | — | — | " | " (9) | 3 | 30 | 0.15 | " |
| 7 | Polyamide 1 (90) | 0.0011 | 0.05 max. | — | Polyethylene 2 (2) | 0.0013 | 2.2*3 | Heavy | Aromatic (9) | " | 50 | 0.14 | " |
| 8 | " (88) | " | " | — | Polybutene-1 (3) | 0.0005 | 2.6 | " | " | " | 17 | " | " |
| 9 | " | " | " | — | Poly-4-methyl-pentene-1 (3) | 0.0002 | 1.8 | " | " | " | 40 | 0.10 | " |
| 10 | Polyester 1 (89) 0.0013 | 0.0008 | " | " | Polyethylene 2 (2) | 0.0012 | 1.6 | " | Ester (9) | 4.5 | 14 | 0.10 | " |
| 11 | " | " | — | " | 0.0015 | 2.6 | " | " | Aromatic (9) | 18 | 0.16 | " | " |
| 12 | " | 0.0005 | " | — | Ethylene-propylene block copolymer (2) | 0.0006 | 2.8 | " | Naphthene (9) | " | 24 | 0.15 | " |
| 13 | " (89) | 0.0001 | " | — | Polyethylene 2 (2) | 0.0001 | 2.1 | " | Paraffin wax (9) | 3 | 12 | 0.22 | " |

Remarks:
*1 Flowing temperature 179° C
*2 Flowing temperature 137° C
*3 Value measured at 185° C
*4 Flowing temperature 147° C
*5 Flowing temperature 173° C
*6 Flowing temperature 138° C Table 2

| Example (Reference No.) | Base resin Name (percent by weight) | Base resin Oil absorption at normal temp. (by weight ratio) | Base resin Oil absorption elevated temp. (by weight ratio) | Additive (percent by weight) | Oil retainer Name (percent by weight) | Oil retainer Oil absorption at normal temp. (by weight ratio) | Oil retainer Oil absorption elevated temp. (by weight ratio) | Ability to release oil | Oil (percent by weight) | Weight ratio of oil/oil retainer | Pleasticizing time during molding (sec.) | Friction coefficient (μ) | Appearance of molded product |
|---|---|---|---|---|---|---|---|---|---|---|---|---|---|
| (Ref) 1 | Polyoxymethylene 1 (88) | 0.0010 | 0.05 max. | — | Ethylene-vinylacetate copolymer (3) | 0.0430 | 1.0 | Medium | Naphthene (9) | 3 | 500 | 0.15 | Good |
| (Ref) 2 | " (94) | " | " | — | " | " | " | " " | " 1 (3) | 15 | 0.30 | " | Fairly good (intermedially wet with Poor |
| (Ref) 3 | Polyamide 1 (88)*1 | 0.0005 | " | — | Polystyrene 1 (3) | ∞ | — | Slight | Ester (9) | 3 | 60 | 0.28 | |
| (Ref) 4 | " | 0.0011 | " | — | " | 0.0004 | 0.05 | — | Naphthene (9) | 3 | >500 | — | inferior Poor dispersion) |
| (Ref) 5 | " (93.5) | 0.0005 | " | — | Ultra-high molecular polyethylene (5)*2 | 0.0012 | 2.2 | Heavy | " (1.5) | 0.3 | 22 | 0.37 | Poor (inferior dispersion) |
| (Ref) 6 | Polyester 1 (89)*3 | 0.0005 | 0.05 max. | — | Ultra-high molecular polyethylene (2) | 0.0012 | 2.1 | Heavy | Naphthene (9) | 4.5 | 23 | 0.11 | |
| (Ref) 7 | " | " | " | — | Polyamide 1 (2) | 0.0010 | <0.05 | — | " | " | >500 | — | Poor (heavily wet with oil) |
| (Ref) 8 | Polypropylene (89) | 0.0008 | 1.9 | — | Polyethylene 1 (2) | 0.0012 | 1.4 | Heavy | Ester | " | 10 | 0.30 | Good*4 |

Remarks:
*1 Flowing temperature 258° C
*2 Flowing temperature >320° C
*3 Flowing temperature 260° C
*4 The molded product is soft.

Table 3

| Example (Reference) No. | Base resin Name (percent by weight) | Base resin Oil absorption at normal temp. (by weight ratio) | Base resin Oil absorption at normal temp. (by weight ratio) | Base resin Additive (percent by weight) | Oil retainer Name (percent by weight) | Oil retainer Oil absorption at normal temp. (by weight ratio) | Oil retainer Oil absorption at elevated temp. (by weight ratio) | Oil retainer Ability to release oil | Oil (percent by weight) | Weight ratio of oil/oil retainer | Plasticizing time during molding (sec.) | Friction coefficient (μ) | Appearance of molded product |
|---|---|---|---|---|---|---|---|---|---|---|---|---|---|
| (Ref) 9 | Polyoxymethylene 1 (91) | 0.0010 | 0.05 max. | — | — | — | — | — | Naphthene (9) | ∞ | >500 | — | Poor |
| (Ref) 10 | " (90.55) | " | " | — | Polyethylene 2 (0.45) | 0.0013 | 2.2*1 Heavy | " | " (20) | 400 | 0.08 | Fairly good | (intermedially) wet with oil |
| 14 | " (90.4) | " | " | — | " (0.6) | " | " | " | " | 15 | 200 | 0.08 | Good |
| 15 | " (90) | " | " | — | " (1) | " | " | " | " | 9 | 45 | 0.09 | " |
| 16 | " (89) | " | " | — | " (2) | " | " | " | " | 4.5 | 13 | 0.12 | " |
| 17 | " (86.5) | " | " | — | " (4.5) | " | " | " | " | 2 | 11 | 0.14 | " |
| 18 | Polyoxymethylene 1 (82) | 0.0010 | 0.05 max. | — | Polyethylene 2 (9) | 0.0013 | 2.2 | Heavy | Naphthene (9) | 1 | 11 | 0.17 | Good |
| 19 | " (73) | " | " | — | " (18) | " | " | " | " | 0.5 | 10 | 0.20 | " |
| (Ref) 11 | " (61) | " | " | — | " (30) | " | " | " | " | 0.3 | 10 | 0.25 | Good*2 |
| (Ref) 12 | " (98) | — | — | — | Polypropylene (2) | — | — | — | — | 0 | 9 | 0.35 | Good |
| (Ref) 13 | " (97.8) | 0.0003 | 0.05 max. | — | " (2) | 0.0008 | 1.9 | Heavy | Ester (0.2) | 0.1 | 9 | 0.33 | " |
| 20 | " (97.2) | " | " | — | " (2) | " | " | " | " (0.8) | 0.4 | 9 | 0.28 | " |
| 21 | Polyoxymethylene 1 (96) | " | " | — | " (2) | " | " | " | " (2) | 1 | 9 | 0.21 | " |
| 22 | Polyoxymethylene 1 (93) | 0.0003 | 0.05 max. | — | Polypropylene (2) | 0.0008 | 1.9 | Heavy | Ester (5) | 2.5 | 14 | 0.15 | Good |
| 23 | " (89) | " | " | — | " (2) | " | " | " | " (9) | 4.5 | 21 | 0.13 | " |
| 24 | " (82) | " | " | — | " (2) | " | " | " | " (16) | 8 | 65 | 0.09 | " |
| 25 (74) | " (58) | " | " | " | " (2) | " | " | " (24) | " (40) | 12 | 300 | 0.08 (intermedially) | Fairly good |
| (Ref) 14 | " | " | " | — | " (0.05) | " | " | " | " (0.05) | 20 | >500 | — | wet with oil) Poor |
| (Ref) 15 | Polyamide 1 (99.9) | 0.0005 | " | — | " (0.05) | 0.0012 | 1.6 | " | " (0.05) | 1 | 26 | 0.43 | Good |
| 26 | " (99.7) | " | " | — | " (0.1) | " | " | " | " (0.2) | 2 | 31 | 0.25 | " |
| 27 | " (97.2) | " | " | — | " (0.8) | " | " | " | " (2) | 2.5 | 45 | 0.21 | " |

Table 3-continued

| Example (Reference) No. | Base resin Name (percent by weight) | Base resin Oil absorption at normal temp. (by weight ratio) | Base resin Oil absorption at normal temp. (by weight ratio) | Additive (percent by weight) | Oil retainer Name (percent by weight) | Oil retainer Oil absorption at normal temp. (by weight ratio) | Oil retainer Oil absorption at elevated temp. (by weight ratio) | Oil retainer Ability to release oil | Oil (percent by weight) | Weight ratio of oil/oil retainer | Plasticizing time during molding (sec.) | Friction coefficient (μ) | Appearance of molded product |
|---|---|---|---|---|---|---|---|---|---|---|---|---|---|
| 28 | Poly-amide (84) | 0.005 | 0.05 max. | — | Polyethylene 2 (1) | 0.0012 | 1.6 | Heavy Ester | 15 (15) | 250 | 0.09 | Fairly good | (intermediately wet with oil) |
| (Ref) 16 | " (73) | " | " | — | " (3) | " | " | " | " (24) | 30 | 500 | 0.08 | Poor (heavily wet with oil) |
| 29 | Poly-ester 1 (98.9) | " | " | — | " (0.1) | 0.0011 | 2.1 | " | Paraffin (1) | 10 | 100 | 0.09 | Good |
| 30 | " (92) | " | " | — | " (3) | " | " | " | " (5) | 1.67 | 19 | 0.13 | " |
| 31 | " (79) | " | " | — | " (7) | " | " | " | " (14) | 2 | 28 | 0.10 | " |
| 32 | " (60) | " | " | — | " (20) | " | " | " | " (20) | 1 | 46 | 0.13 | " |
| (Ref) 17 | " (40) | " | " | — | " (30) | " | " | " | " (30) | 1 | 65 | 0.12 | Good*2 |

Remarks:
*1Value measured at 185° C
*2The molded product is soft.

Table 4

| Example Reference No. | Base Resin Name (percent by weight) | Base Resin Oil absorption at normal temp. (by weight ratio) | Base Resin Oil absorption elevated temp. (by weight ratio) | Additive (percent by weight) | Oil Retainer Name (percent by weight) | Oil Retainer Oil absorption at normal temp. (by weight ratio) | Oil Retainer Oil absorption elevated temp. (by weight ratio) | Ability to release oil | Oil (percent by weight) | Weight ratio of oil/oil retainer | Plasticizing time during molding (sec.) | Friction coefficient ($\mu$) | Appearance of molded product |
|---|---|---|---|---|---|---|---|---|---|---|---|---|---|
| 33 | Polyamide 1 (89) | 0.0011 | 0.05 max. | — | Polyethylene 2 (2) | 0.013 | 2.2* | Heavy | Naphthene (9) | 4.5 | 30 | 0.09 | Good |
| 34 | " (80) | " | " | Graphite (9) | " | " | " | " | " | " | 22 | 0.09 | " |
| 35 | " (80) | " | " | Molybdenum disulfide (9) | " | " | " | " | " | " | 45 | 0.09 | " |
| 36 | " (84) | " | " | Teflon dust (5) | " | " | " | " | " | " | 200 | 0.08 | " |
| 37 | " (84) | " | " | Boron nitride (5) | " | " | " | " | " | " | 75 | 0.09 | " |
| 38 | " (84) | " | " | Graphite fluoride (5) | " | " | " | " | " | " | 110 | 0.08 | " |
| 39 | Polyamide 1 (59) | 0.0011 | 0.05 max. | Talc (30) | Polyethylene 2 (2) | 0.0013 | 2.2 | Heavy | Naphthene (9) | 4.5 | 25 | 0.10 | Good |
| 40 | " (59) | " (9) | " | Calcium (30) | " | " | " | " | " | " | 27 | 0.11 | " |
| 41 | " (59) | " | " | Kaolin (30) | " | " | " | " | " | " | 22 | 0.11 | " |
| 42 | " (59) | " | " | Glass dust (30) | " | " | " | " | " | 24 | 0.10 | " | " |
| 43 | " (59) | " | " | glass beads (30) | " | " | " | " | " | " | 21 | 0.11 | " |
| 44 | " (69) | " | " | Glass Microspheres (20) | " | " | " | " | " | " | 24 | 0.10 | " |
| 45 | " (69) | " | " | Glass fiber (20) | " | " | " | " | " | " | 26 | 0.12 | " |
| 46 | Polyamide 1 (69) | 0.0011 | 0.05 max. | Carbon fiver (20) | Polyethylene 2 (2) | 0.0013 | 2.2 | Heavy | Naphthene (9) | 4.5 | 21 | 0.08 | Good |
| 47 | " (69) | " | " | Asbestos (20) | " | " | " | " | " | " | 21 | 0.10 | " |
| 48 | " (69) | " | " | Aluminium dust (30) | " | " | " | " | " | " | 28 | 0.12 | " |
| 49 | " (59) | " | " | Iron dust (30) | " | " | " | " | " | " | 25 | 0.10 | " |
| 50 | " (59) | " | " | Copper dust (30) | " | " | " | " | " | ∞ | 30 | 0.10 | " |
| 51 | " (60) | " | " | Graphite (9) Glass fiber (20) | " | " | " | " | " | " | 22 | 0.09 | " |
| (Ref) 18 | " (82) | " | " | Graphite (9) | — | — | — | — | " | 8 | >500 | — | Poor |

Remarks: *Value measured at 185° C

Table 5

| Example (Reference) No. | Base resin Name (percent by weight) | Base resin Oil absorption at normal temp. (by weight ratio) | Base resin Oil absorption elevated temp. (by weight ratio) | Additive (percent by weight) | Oil retainer Name (percent by weight) | Oil retainer Oil absorption at normal temp. (by weight ratio) | Oil retainer Oil absorption elevated temp. (by weight ratio) | Ability to release oil | Oil (percent by weight) | Weight ratio of oil/oil retainer | Plasticizing time during molding (sec.) | Friction coefficient (μ) | Appearance of molded product |
|---|---|---|---|---|---|---|---|---|---|---|---|---|---|
| 52 | Polyoxymethylene 2 (89) | 0.0013 | 0.05 max. | — | Polyethylene 1 (2) | 0.0012 | 2.3* | Heavy | Naphthene (9) | 4.5 | 13 | 0.13 | Good |
| 53 | Polyamide 2 (89) | 0.0011 | " | — | " | " | " | " | " | " | 27 | 0.09 | " |
| 54 | Polyamide 3 (89) | 0.0011 | " | — | " | " | " | " | " | " | 25 | 0.10 | " |
| 55 | Polyamide 4 (89) | 0.0012 | " | — | " | " | " | " | " | " | 27 | 0.09 | " |
| 56 | Polyamide 5 (89) | 0.0011 | " | — | " | " | " | " | " | " | 27 | 0.10 | " |
| 57 | Polyamide 6 (89) | 0.0014 | " | — | " | " | " | " | " | " | 29 0.10 | " | " |
| 58 | Polyester 2 (89) | 0.0003 | 0.05 max. | — | Polyethylene 1 (2) | 0.0012 | 2.3 | Heavy | Naphthene (9) | 4.5 | 110 | 0.11 | good |
| 59 | Polyester 3 (89) | 0.0008 | " | — | " | " | " | " | " | " | 32 | 0.10 | " |
| 60 | Polyester 4 (89) | 0.0002 | " | — | " | " | " | " | " | " | 28 | 0.12 | " |
| 61 | Polyester 5 (89) | 0.0010 | " | — | " | " | " | " | " | " | 38 | 0.12 | " |
| 62 | Polycarbonate (89) | 0.0010 | " | — | " | " | " | " | " | " | 16 | 0.25 | " |
| 63 | Polyvinyl chloride 1 (89) | 0.0018 | " | — | " | " | " | " | " | " | 25 | 0.12 | " |
| 64 | Polyvinyl chloride 2 (89) | 0.0018 | " | — | " | " | " | " | " | " | 28 | 0.12 | " |
| 65 | Polyvinyl chloride 3 (89) | 0.0019 | " | — | " | " | " | " | " | " | 23 | 0.11 | " |
| 66 | Polyvinyl chloride 4 (89) | 0.0020 | 0.05 max. | — | Polyethylene 1 (2) | 0.0012 | 2.3 | Heavy | Naphthene (9) | 4.5 | 23 | 0.12 | Good |
| 67 | Polystyrene 1 (89) | 0.0005 | " | — | " | " | " | " | " | " | 13 | 0.11 | " |
| 68 | Polystyrene 2 (89) | 0.0008 | " | — | " | " | " | " | " | " | 14 | 0.10 | " |
| 69 | Polystyrene 3 (89) | 0.0010 | " | — | " | " | " | " | " | " | 13 | 0.11 | " |
| 70 | Acrylic resin 1 (89) | 0.0008 | " | — | " | " | " | " | " | " | 11 | 0.15 | " |
| 71 | Acrylic resin 2 (89) | 0.0007 | " | — | " | " | " | " | " | " | " | 12 | " |
| 72 | Acrylic resin 3 (89) | 0.0009 | " | — | " | " | " | " | " | " | 9 | 0.16 | " |
| 73 | Acrylic resin 4 (89) | 0.0007 | " | — | " | " | " | " | " | " | 11 | 0.18 | 0.16 |
| 74 | Fluorocarbon resin 1 (89) | 0.0001 | 0.05 max. | — | Polyethylene 1 (2) | 0.0012 | 2.3 | Heavy | Naphthene (9) | 4.5 | 500 | 0.05 | Good |
| 75 | Fluorocarbon resin 2 | 0.0000 | " | — | " | " | " | " | " | " | " | " | " |

Table 5-continued

| Example (Reference No.) | Base resin | | | | Oil retainer | | | | | | Weight ratio of oil/oil retainer | Plasticizing time during molding (sec.) | Friction coefficient (μ) | Appearance of molded product |
|---|---|---|---|---|---|---|---|---|---|---|---|---|---|---|
| | Name (percent by weight) | Oil absorption at normal temp. (by weight ratio) | Oil absorption elevated temp. (by weight ratio) | Additive (percent by weight) | Name (percent by weight) | Oil absorption at normal temp. (by weight ratio) | Oil absorption elevated temp. (by weight ratio) | Ability to release oil | Oil (percent by weight) | | | | | |
| 76 | Fluorocarbon resin 3 (89) | 0.0001 | " | — | " | " | " | " | " | | " | " | " | " |
| 77 | Fluorocarbon resin 4 (89) | 0.0001 | " | — | " | " | " | " | " | | " | " | " | " |
| 78 | Fluorocarbon resin 5 (89) | 0.0002 | " | — | " | " | " | " | " | | " | 450 | " | " |
| 79 | Polyphenylene oxide 1 (89) | 0.0012 | " | — | " | " | " | " | " | | " | 30 | 0.15 | " |
| 80 | Polyphenylene oxide 2 (89) | 0.0008 | 0.05 max. | — | Polyethylene 1 (2) | 0.0012 | 2.3 | Heavy | Naphthene (9) | | 4.5 | 25 | 0.14 | Good |
| 81 | Polyphenylene sulfide (89) | 0.0003 | " | — | " | " | " | " | " | | " | 13 | 1.12 | " |
| 82 | Polysulfone (89) | 0.0005 | " | — | " | " | " | " | " | | " | 21 | 0.09 | " |
| 83 | Polyaryl-sulfone (89) | 0.0002 | " | — | " | " | " | " | " | | " | 42 | 0.10 | " |
| 84 | Polyaryl-ether (89) | 0.0002 | " | — | " | " | " | " | " | | " | 38 | 0.10 | " |
| 85 | Polyether sulfone (89) | 0.0003 | " | — | " | " | " | " | " | | " | 40 | 0.09 | " |
| 86 | Polyvinyl formal (89) | 0.0020 | 0.05 max. | — | Polyethylene 1 (2) | 0.0012 | 2.3 | Heavy | Naphthene (9) | | 4.5 | 110 | 0.15 | Good |
| 87 | Polyvinyl butyral (89) | 0.0023 | " | — | " | " | " | " | " | | " | 120 | 0.14 | " |
| 88 | Acrylonitrile-styrene copolymer (89) | 0.0004 | " | — | " | " | " | " | " | | " | 15 | 0.11 | " |
| 89 | Acrylonitrile-butadiene-styrene copolymer (89) | " | " | — | " | " | " | " | " | | " | 13 | 0.15 | " |

Remarks: "Value measured at 185° C

Table 6

| Example Reference No. | Base resin Name | (percent by weight) | Oil absorption at normal temp. (by weight ratio) | Oil absorption elevated temp. (by weight ratio) | Additive (percent by weight) | Oil retainer Name (percent by weight) | Oil absorption to normal temp. (by weight ratio) | Oil absorption elevated temp. (by weight ratio) | Ability to release oil | Oil (percent by weight) | Weight ratio of oil/oil retainer | Plasticizing time during molding (sec.) | Friction Coefficient (μ) | Appearance of molded product |
|---|---|---|---|---|---|---|---|---|---|---|---|---|---|---|
| (Ref) 19 | Polyoxymethylene 1 | — | — | — | — | — | — | — | — | — | — | 9 | 0.35 | Good |
| (Ref) 20 | Polyoxymethylene 2 | — | — | — | — | — | — | — | — | — | — | 9 | 0.35 | " |
| (Ref) 21 | Polyamide 1 | — | — | — | — | — | — | — | — | — | — | 20 | 0.45 | " |
| (Ref) 22 | Polyamide 2 | — | — | — | — | — | — | — | — | — | — | 18 | 0.45 | " |
| (Ref) 23 | Polyamide 3 | — | — | — | — | — | — | — | — | — | — | 17 | 0.48 | " |
| (Ref) 24 | Polyamide 4 | — | — | — | — | — | — | — | — | — | — | 19 | 0.48 | " |
| (Ref) 25 | Polyamide 5 | — | — | — | — | — | — | — | — | — | — | 18 | 0.46 | " |
| (Ref) 26 | Polyamide 6 | — | — | — | — | — | — | — | — | — | — | 22 | 0.49 | " |
| (Ref) 27 | Polyester 1 | — | — | — | — | — | — | — | — | — | — | 10 | 0.31 | Good |
| (Ref) 28 | Polyester 2 | — | — | — | — | — | — | — | — | — | — | 42 | 0.33 | " |
| (Ref) 29 | Polyester 3 | — | — | — | — | — | — | — | — | — | — | 13 | 0.30 | " |
| (Ref) 30 | Polyester 4 | — | — | — | — | — | — | — | — | — | — | 12 | 0.36 | " |
| (Ref) 31 | Polyester 5 | — | — | — | — | — | — | — | — | — | — | 17 | 0.36 | " |
| (Ref) 32 | Polycarbonate | — | — | — | — | — | — | — | — | — | — | 13 | 0.46 | " |
| (Ref) 33 | Polyvinyl chloride 1 | — | — | — | — | — | — | — | — | — | — | 18 | 0.41 | " |
| (Ref) 34 | Polyvinyl chloride 2 | — | — | — | — | — | — | — | — | — | — | 18 | 0.40 | " |
| (Ref) 35 | Polyvinyl chloride 3 | — | — | — | — | — | — | — | — | — | — | 16 | 0.41 | " |
| (Ref) 36 | Polyvinyl chloride 4 | — | — | — | — | — | — | — | — | — | — | 17 | 0.41 | " |
| (Ref) 37 | Polystyrene 1 | — | — | — | — | — | — | — | — | — | — | 10 | 0.44 | Good |
| (Ref) 38 | Polystyrene 2 | — | — | — | — | — | — | — | — | — | — | 10 | 0.45 | " |
| (Ref) 39 | Polystyrene 3 | — | — | — | — | — | — | — | — | — | — | 11 | 0.45 | " |
| (Ref) 40 | Acrylic resin 1 | — | — | — | — | — | — | — | — | — | — | 9 | 0.55 | " |
| (Ref) 41 | Acrylic resin 2 | — | — | — | — | — | — | — | — | — | — | 10 | 0.52 | " |
| (Ref) 42 | Acrylic resin 3 | — | — | — | — | — | — | — | — | — | — | 9 | 0.53 | " |
| (Ref) 43 | Acrylic resin 4 | — | — | — | — | — | — | — | — | — | — | 10 | 0.52 | " |
| (Ref) 44 | Fluorocarbon resin 1 | — | — | — | — | — | — | — | — | — | — | 400 | 0.21 | " |
| (Ref) 45 | Fluorocarbon resin 2 | — | — | — | — | — | — | — | — | — | — | 350 | 0.20 | " |
| (Ref) 46 | Fluorocarbon resin 3 | — | — | — | — | — | — | — | — | — | — | 400 | 0.20 | " |
| (Ref) 47 | Fluorocarbon resin 4 | — | — | — | — | — | — | — | — | — | — | 300 | 0.20 | " |
| (Ref) 48 | Fluorocarbon Resin 5 | — | — | — | — | — | — | — | — | — | — | 85 | 0.22 | " |
| (Ref) 49 | Polyphenylene oxide 1 | — | — | — | — | — | — | — | — | — | — | 21 | 0.35 | " |
| (Ref) 50 | Polyphenylene oxide 2 | — | — | — | — | — | — | — | — | — | — | 20 | 0.35 | " |
| (Ref) 51 | Polyphenylene sulfide | — | — | — | — | — | — | — | — | — | — | 9 | 0.32 | " |
| (Ref) 52 | Polysulfone | — | — | — | — | — | — | — | — | — | — | 13 | 0.31 | " |
| (Ref) 53 | Polyarylsulfone | — | — | — | — | — | — | — | — | — | — | 25 | 0.30 | " |
| (Ref) 54 | Polyarylether | — | — | — | — | — | — | — | — | — | — | 22 | 0.32 | " |
| (Ref) 55 | Polyether sulfone | — | — | — | — | — | — | — | — | — | — | 26 | 0.35 | " |
| (Ref) 56 | Polyvinyl formal | — | — | — | — | — | — | — | — | — | — | 40 | 0.46 | " |

Table 6-continued

| Example (Reference No.) | Base resin | | | | | Oil retainer | | | | | | | | | |
|---|---|---|---|---|---|---|---|---|---|---|---|---|---|---|---|
| | Name | Oil absorption at normal temp. (by weight ratio) | Oil absorption elevated temp. (by weight ratio) | Additive | | Name | | Oil absorption to normal temp. (by weight ratio) | Oil absorption elevated temp. (by weight ratio) | Ability to release oil | Oil (percent by weight) | Weight ratio of oil/oil retainer | Plasticizing time during molding (sec.) | Friction Coefficient (μ) | Appearance of molded product |
| | (percent) by weight | | | (percent by weight) | | | (percent by weight) | | | | | | | | |
| (Ref) 57 | Polyvinyl butyral | — | — | — | | — | — | — | — | — | — | — | 43 | 0.48 | " |
| (Ref) 58 | Acrylonitrile-styrene copolymer | — | — | — | | — | — | — | — | — | — | — | 9 | 0.40 | Good |
| (Ref) 59 | Acrylonitrile-Butadiene-styrene copolymer | — | — | — | | — | — | — | — | — | — | — | 10 | 0.52 | " |

What is claimed is:

1. A stable resin composition which comprises 0.1 to 25 percent by weight of an oil retainer, 99.8 to 50 percent by weight of a base resin and 0.1 to 25 percent by weight of an oil, with the weight ratio of oil to oil retainer being from 2 to 1 to 15 to 1 the said oil being absorbed and remaining absorbed by the oil retainer;

said oil retainer being a thermoplastic resin which has a lower flowing temperature than the base resin, and at normal room temperatures remains undissolved in the oil and absorbs not more than 0.03 times its own weight of oil, and which, at a temperature 10° C higher than the flowing temperature of the base resin, dissolves in the oil or absorbs not less than 0.3 times its own weight of oil;

said base resin being a thermoplastic resin which remains undissolved in the oil and absorbs not more than 0.03 times its own weight of oil, and, at a temperature 10° C higher than the flowing temperature of the base resin, it absorbs not more than one half of the weight of the oil absorbed by the oil retainer and is different from the oil retainer;

and said oil being a lubricating oil which is liquid at normal room temperatures or which, though solid at normal room temperatures, becomes fluidized at a temperature lower than the flowing temperature of the base resin.

2. A resin composition according to claim 1, in which said base resin is at least one resin selected from the group consisting of polyacetal resin, polyamide resin, polyester resin, polycarbonate resin, polyvinyl chloride resin, polystyrene resin, acrylic resin, fluorocarbon resins, polyphenylene oxide resin, polyphenylene sulfide resin, polysulfone resin, polyaryl sulfone resin, polyaryl ether resin, polyether sulfone resin, polyvinyl formal resin, polyvinyl butyral resin, acrylonitrilestyrene copolymer, acrylonitrile-butadiene-styrene copolymer, and these resins in the form of copolymers incorporating not more than 20 mol percent of other copolymerizable monomers.

3. A resin composition according to claim 1, in which said oil retainer is at least one resin selected from the group consisting of polyethylene resin, polypropylene resin, polybutene-1resin, polymethylpentene resin and polystyrene.

4. A resin composition according to claim 1, in which said oil is selected from the group consisting of paraffin oil, naphthene oil, aromatic oil and ester oil.

5. A resin composition according to claim 1, which comprises in addition 1 to 70 percent by weight of an additive, wherein said additive is at least one member selected from the group consisting of solid lubricant, inorganic powdery filler, inorganic fibrous reinforcement, metal powder, and metal fiber.

6. A resin composition according to claim 1, which comprises at least one oil retainer selected from the group consisting of polyethylene resin, polypropylene, polybutene-1resin and polymethyl pentene resin, and an oil selected from the group consisting of paraffin oil and naphthene oil.

7. A resin composition according to claim 6, which comprises in addition at least one additive selected from the group consisting of graphite, molybdenum disulfide, polytetrafluoroethylene powder, boron nitride, graphite fluoride, talc, calcium carbonate, kaolin, glass powder, galss beads, glass microspheres, glass fiber, carbon fiber, asbestos, aluminium dust, iron dust and copper dust.

8. A resin composition according to claim 1, which comprises at least one base resin selected from the group consisting of polyacetal resin, polyamide resin, polyester resin and fluorocarbon resins and these resins in the form of copolymers incorporating not more than 20 mol percent of copolymerizable monomers, at least one oil retainer selected from the group consisting of polyethylene resin, polypropylene resin, polybutene-1,polymethylpentene resin and polystyrene, and an aromatic oil.

9. A resin composition according to claim 8, which comprises in addition at least one additive selected from the group consisting of graphite, molybdenum disulfide, polytetrafluoroethylene powder, boron nitride, graphite fluoride, talc, calcium carbonate, kaolin, glass powder, glass beads, glass microspheres, glass fiber, carbon fiber, asbestos, aluminium dust, iron dust and copper dust.

10. A resin composition according to claim 1, which comprises at least one oil retainer selected from the group consisting of polyethylene resin, polypropylene, polybutene-1resin and polymethyl pentene resin, and an ester oil.

11. A resin composition according to claim 10, which comprises in addition at least one additive selected from the group consisting of graphite, molybdenum disulfide, polytetrafluoroethylene powder, boron nitride, graphite fluoride, talc, calcium carbonate, kaolin, glass powder, glass beads, glass microspheres, glass fiber, carbon fiber, asbestos, aluminium dust, iron dust and copper dust.

12. A resin composition according to claim 1, which comprises at least one base resin selected from the group consisting of polyacetal resin, polyamide resin, polyester resin, polycarbonate resin, polyphenylene oxide resin and these resins in the form of copolymers incorporating not more than 20 mol percent of copolymerizable monomers, at least one oil retainer selected from the group consisting of polyethylene resin and polypropylene resin, and an oil selected from the group consisting of paraffin oil and naphthene oil.

13. A resin composition according to claim 12, which comprises in addition at least one additive selected from the group consisting of graphite, molybdenum disulfide, polytetrafluoroethylene powder, boron nitride, graphite fluoride, talc, calcium carbonate, kaolin, glass powder, glass beads, glass microspheres, glass fiber, carbon fiber, asbestos, aluminium dust, iron dust and copper dust.

14. A resin composition according to claim 1, which comprises at least one base resin selected from the group consisting of polyacetal resin, polyamide resin, polyester resin, polyphenylene oxide resin and these resins in the form of copolymers incorporating not more than 20 mol percent of copolymerizable monomers, at least one oil retainer selected from the group consisting of polyethylene resin and polypropylene resin, and an ester oil.

15. A resin composition according to claim 14, which comprises in addition at least one additive selected from the group consisting of graphite, molybdenum, disulfide, polytetrafluoroethylene powder, boron nitride, graphite fluoride, talc, calcium carbonate, kaolin, glass powder, glass beads, glass microspheres, glass fiber, caroon fiber, asbestos, aluminium dust, iron dust and copper dust.

16. A resin composition according to claim 1, in which the amount of said base resin is 98.5 to 70 percent by weight.

17. A resin composition according to claim 1, in which the amount of said oil retainer is 0.5 to 10 percent by weight.

18. A resin composition according to claim 1, in which the amount of said oil is 1 to 20 percent by weight.

19. A resin composition according to claim 1, in which the amount of said base resin is 96 to 80 percent by weight.

20. A resin composition according to claim 1, in which the amount of said oil retainer is 1 to 5 percent by weight.

21. A resin composition according to claim 21, in which the amount of said oil is 3 to 15 percent by weight.

22. A resin composition according to claim 1, in which the weight ratio of said oil to said oil retainer is from 12 to 1 to 3 to 1.

23. A resin composition according to claim 1, which comprises 99.5 to 55 percent by weight of a base resin selected from the group consisting of polyacetal and polyamide, 0.1 to 20 percent by weight of a polyethylene resin having a number average molecular weight of more than 10,000 but not exceeding 500,000, and 0.4 to 25 percent by weight of an oil selected from the group consisting of paraffin oil and naphthene oil.

24. A resin composition according to claim 1, which comprises 98.4 to 50 percent by weight of polyacetal, 0.1 to 10 percent by weight of a polyethylene resin having a number average molecular weight of more than 10,000 but not exceeding 500,000, 1 to 20 percent by weight of an oil selected from group consisting of paraffin oil and naphthene oil, and 0.5 to 20 percent by weight of at least one additive selected from the group consisting of graphite, molybdenum disulfide, polytetrafluoroethylene, graphite fluoride and carbon fiber.

25. A resin composition according to claim 1 in which said oil is absorbed into said oil retainer and dispersed into said base resin.

* * * * *